United States Patent
Shiner et al.

(10) Patent No.: US 8,363,370 B2
(45) Date of Patent: *Jan. 29, 2013

(54) OVER-VOLTAGE PROTECTION CIRCUIT

(75) Inventors: Andrew D. Shiner, Whitby (CA); Carl D. Schaaff, Guelph (CA); Richard C. Madter, Puslinch (CA); Roshy Stan Mathew, Waterloo (CA); Michael F. Habicher, Toronto (CA); Quang A. Luong, Mississauga (CA)

(73) Assignee: Research In Motion Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/280,554

(22) Filed: Oct. 25, 2011

(65) Prior Publication Data

US 2012/0039008 A1    Feb. 16, 2012

Related U.S. Application Data

(60) Continuation of application No. 13/038,902, filed on Mar. 2, 2011, now Pat. No. 8,072,724, which is a continuation of application No. 12/436,992, filed on May 7, 2009, now Pat. No. 7,948,727, which is a division of application No. 11/371,686, filed on Mar. 9, 2006, now abandoned, which is a continuation of application No. 10/261,038, filed on Sep. 30, 2002, now Pat. No. 7,035,070.

(60) Provisional application No. 60/325,551, filed on Oct. 1, 2001.

(51) Int. Cl.
*H02H 3/20*    (2006.01)
*H02H 9/04*    (2006.01)
*H01H 47/00*    (2006.01)
*H01H 47/32*    (2006.01)

(52) U.S. Cl. .......... 361/91.1; 361/155; 361/156
(58) Field of Classification Search .......... 361/91.1
See application file for complete search history.

(56) References Cited

U.S. PATENT DOCUMENTS

| | | | |
|---|---|---|---|
| 4,164,698 A | 8/1979 | Kleeberg | |
| 4,571,533 A | 2/1986 | Dey | |
| 5,581,160 A | 12/1996 | Fujita | |
| 5,610,511 A | 3/1997 | Parker | |
| 5,710,504 A | 1/1998 | Pascual et al. | |
| 5,825,174 A | 10/1998 | Parker | |
| 5,932,932 A | 8/1999 | Agatsuma et al. | |
| 5,977,720 A | 11/1999 | Pace et al. | |
| 6,061,528 A | 5/2000 | Ichihara et al. | |
| 6,259,229 B1 | 7/2001 | Ashtiani et al. | |
| 6,331,764 B1 | 12/2001 | Oglesbee et al. | |
| 6,437,539 B2 | 8/2002 | Olsson et al. | |
| 6,531,845 B2 | 3/2003 | Kerai et al. | |
| 6,700,766 B2 | 3/2004 | Sato | |
| 7,948,727 B2 * | 5/2011 | Shiner et al. | 361/91.1 |
| 8,072,724 B2 * | 12/2011 | Shiner et al. | 361/91.1 |

* cited by examiner

*Primary Examiner* — Dharti Patel
(74) *Attorney, Agent, or Firm* — Jones Day

(57) ABSTRACT

An over-voltage protection circuit is disclosed herein for protection against over-voltage of an energy storage device while charging. The circuit operates within the operational limits of a battery-operated device, such as a mobile or handheld device. The over-voltage protection circuit comprises an over-voltage protection device, and an over-voltage protection controller. The controller allows current to flow to the over-voltage protection device only when an energy storage device is experiencing over-voltage. In allowing current to flow to the over-voltage protection device only when the voltage across the energy storage device is above a predetermined voltage, power conservation is achieved.

12 Claims, 6 Drawing Sheets

OVER-VOLTAGE PROTECTION CIRCUIT

CROSS-REFERENCE TO RELATED APPLICATIONS

This is a continuation of U.S. application Ser. No. 13/038,902, filed Mar. 2, 2011, which is a continuation of U.S. application Ser. No. 12/436,992, filed May 7, 2009 (now U.S. Pat. No. 7,948,727), which is a division of U.S. application Ser. No. 11/371,686, filed Mar. 9, 2006 (abandoned), which is a continuation of U.S. application Ser. No. 10/261,038, filed Sep. 30, 2002 (now U.S. Pat. No. 7,035,070), which claims the benefit of U.S. Provisional Application No. 60/325,551, filed Oct. 1, 2001, all the above applications hereby incorporated herein by reference.

TECHNICAL FIELD

The present invention relates to energy storage components used in battery-operated devices. In particular, the present invention relates to protection against over-voltage of such energy storage components within the operational limits of a battery-operated device while charging.

BACKGROUND

Many mobile devices, such as cellular telephones, personal digital assistants (PDAs), and other handheld computing and communicating devices, rely upon standard energy storage devices, such as battery cells, for providing power on which to operate.

Though disposable battery cells, such as alkaline cells, are a well-known and reliable technology, it is common in such mobile devices to employ rechargeable battery cells. These rechargeable batteries depend on a number of known cell types, including Ni-Cad, Ni-MH, and Li-Ion cells. All these cells are known to those of skill in the art, as are some of their deficiencies.

Although some mobile devices are able to function with standard off-the-shelf rechargeable batteries, many use a specialised rechargeable battery made particularly for that make and model of mobile device. A charging device is necessary in order to recharge the mobile device's battery. Such a charging device may be a dedicated device, or may be integrated into an existing accessory, such as a cradle. The life of the battery can be drastically curtailed by improperly charging, or over discharging the battery.

Over-voltage protection circuits are commonly used to prevent a voltage across an energy storage device, such as a battery, from exceeding a set predetermined, or threshold, voltage. Such an energy storage device can comprise a plurality of energy storage components. Presently, over-voltage protection is typically achieved by connecting resistors in parallel with the energy storage device. In such over-voltage circuits, current continuously flows through the resistors whether the terminal voltage is above or below the set predetermined voltage, resulting in significant wasted power. Such a conventional configuration is illustrated in FIG. 1.

The energy storage devices 102, 104 illustrated in FIG. 1 are super capacitors, showing an example of a particular energy storage device. However, those of skill in the art will appreciate, the energy storage devices can be any suitable device, such as Ni-Cad, Ni-MH, and Li-Ion cells, for example.

FIG. 1 shows a typical over-voltage protection circuit that is well known in the art. In this circuit 100, energy storage devices 102, 104 are connected in series. Each energy storage device has a parasitic internal leakage current. The magnitude of the leakage current may vary over a range of values, even among energy storage devices from the same manufacturing batch. These varying leakage rates result in the voltage across different energy storage devices decreasing at different rates. When the energy storage devices 102, 104 are charged, the energy storage device with the lower leakage rate, and hence the greater voltage, can exceed the maximum voltage specified for that energy storage device before the combined voltage of both energy storage devices reaches a desired terminal voltage. Resistors 106, 108 are placed in parallel with energy storage devices 102, 104 respectively in order to equalise the respective voltage drops across each energy storage device. Charging leads 110 are shown in the drawing, for connecting a charging circuit (not shown) to the energy storage devices.

As one skilled in the art can appreciate, the resistors act to increase the total current flowing through each energy storage device, since the resistors are effectively in parallel with the parasitic resistance of the energy storage devices. This causes the energy storage devices to discharge any excess charge faster than if the resistors were not present. The resistor values are normally chosen so that the current in each resistor is much greater than the largest specified internal leakage current of the individual energy storage device. Given that the resistors typically come from the same manufacturing batch and are quite closely matched in value (within a few percent), the rate at which the voltage of the energy storage devices decrease is therefore more closely matched than if the resistors were absent.

However, this configuration results in continually wasted power since current is constantly flowing through the resistors and the current in each resistor is greater than the leakage current of the capacitor. A more power-efficient solution is required.

It is therefore desirable to provide a configuration that allows current to flow only when an energy storage component is above a predetermined voltage and thereby conserve power.

SUMMARY

It is an object of the present invention to obviate or mitigate at least one disadvantage of previous over-voltage protection circuits, particularly those provided for use with handheld or mobile devices.

In an aspect of the invention, a protection circuit to prevent over-voltage of an energy storage device while being charged is provided. The energy storage device can be, for example, a super capacitor, or a lithium-ion battery.

In a first aspect, the present invention provides an over-voltage protection circuit for connection to a charging circuit for maintaining a voltage across an energy storage device at or below a predetermined voltage during charging. The circuit comprises an over-voltage protection device and an over-voltage protection controller. The over-voltage protection controller connects the over-voltage protection device in parallel with the energy storage device only when the voltage across the energy storage device exceeds the predetermined voltage, so as to draw excess charge from the energy storage device.

The over-voltage protection controller can comprise a switch actuated in response to an over-voltage condition at the energy storage device. The controller can further comprise an over-voltage detector coupled to the energy storage device and to the switch, which causes the switch to be actuated when a voltage measured across the energy storage device exceeds the predetermined voltage. This over-voltage detector and switch can be integral with one another.

In general, the over-voltage protection device either dissipates excess charge drawn from the energy storage device, or temporarily stores the excess charge.

A resistor is an example of an over-voltage protection device that dissipates excess charge drawn from the energy storage device. A zener diode or a shunt resistor may also be used as a dissipating over-voltage protection device, with the added advantage that each of these components can also act as the over-voltage protection controller. If either of these two is used in the over-voltage protection circuit, the use of a resistor or other over-voltage protection device is optional since the zener diode and shunt resistor act as both over-voltage protection controller and over-voltage protection device. In the case of the zener diode, a switch is preferably connected to the zener diode; the switch is closed during charging and open otherwise.

In a particular embodiment, an over-voltage protection circuit comprises a shunt regulator (occasionally called a voltage reference) in series with a resistor, and these are in parallel with an energy storage device. The shunt regulator prevents the voltage of the energy storage device from rising above a set predetermined voltage and only allows current to flow through it and the resistor when the voltage of the energy storage device is at or above the predetermined voltage, thereby conserving power.

A capacitor and an inductor are both examples of an over-voltage device that temporarily stores excess charge drawn from the energy storage device. Since these devices do not generally dissipate charge, a dissipation controller is preferably used in such configurations to dissipate the excess charge stored in the over-voltage protection device. The dissipation controller can comprise a dissipation switch that connects the over-voltage protection device to ground in order to dissipate the stored charge. Preferably, the dissipation controller also comprises a dissipation control mechanism that actuates the dissipation switch so as to connect and disconnect the over-voltage protection device from the dissipation controller.

There are alternative embodiments of the present invention that can be used in situations where the energy storage device comprises a plurality of energy storage components. An over-voltage device that temporarily stores excess charge is advantageously used in such instances to avoid over-voltage by balancing charge between the plurality of energy storage components.

Consider the exemplary case of a capacitor being used as an over-voltage protection device for two energy storage components. The over-voltage protection controller then comprises first and second switches coupled to the first and second energy storage components, respectively, and connected in series to either end of the capacitor. The switches are actuated, during over-voltage, so as to connect or disconnect the capacitor to each energy storage component in order to balance charge between them. One or more over-voltage detectors may be used in order to detect when over-voltage occurs. This detector can also control the actuation of the switches. Alternatively, an actuating means can be provided that actuates the connection or disconnection of the capacitor to each energy storage component at a regular time interval.

Next, consider the exemplary case of an inductor being used as an over-voltage protection device for two energy storage components. The over-voltage protection controller comprises first and second switches coupled to the first and second energy storage components, respectively, and connected in series with the inductor with respect to the charging circuit. The over-voltage protection controller preferably further comprises first and second diodes connected in parallel with the first and second switches, respectively. The switches are actuated, during over-voltage, to connect or disconnect the inductor to each energy storage component in order to balance charge between them. One or more over-voltage detectors may be used in order to detect when over-voltage occurs. This detector can also control the actuation of the switches. Alternatively, an actuating means can be provided that actuates the connection or disconnection of the capacitor to each energy storage component at a regular time interval.

In another aspect of the invention, an over-voltage protection circuit is provided for connection to a charging circuit for use with a handheld device for maintaining a voltage across an energy storage device at or below a predetermined voltage so as to avoid over-voltage during charging. The circuit comprises an over-voltage protection device and an over-voltage protection controller. The over-voltage protection controller connects the over-voltage protection device in parallel with the energy storage device in response to an over-voltage condition at the energy storage device, so as to draw excess charge from the energy storage device. The over-voltage protection circuit is connected to charging leads, which are connected to the charging circuit. Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Generally, the present invention provides an over-voltage protection circuit for protection against over-voltage of an energy storage device while charging. The circuit advantageously operates within the operational limits of a battery-operated device, such as a mobile or handheld device.

An over-voltage protection circuit according to the present invention comprises an over-voltage protection device, and an over-voltage protection controller. The controller allows current to flow to the over-voltage protection device only when an energy storage device is experiencing over-voltage. In allowing current to flow to the over-voltage protection device only when the voltage across the energy storage device is above a predetermined voltage, power conservation is achieved.

Figure 2:
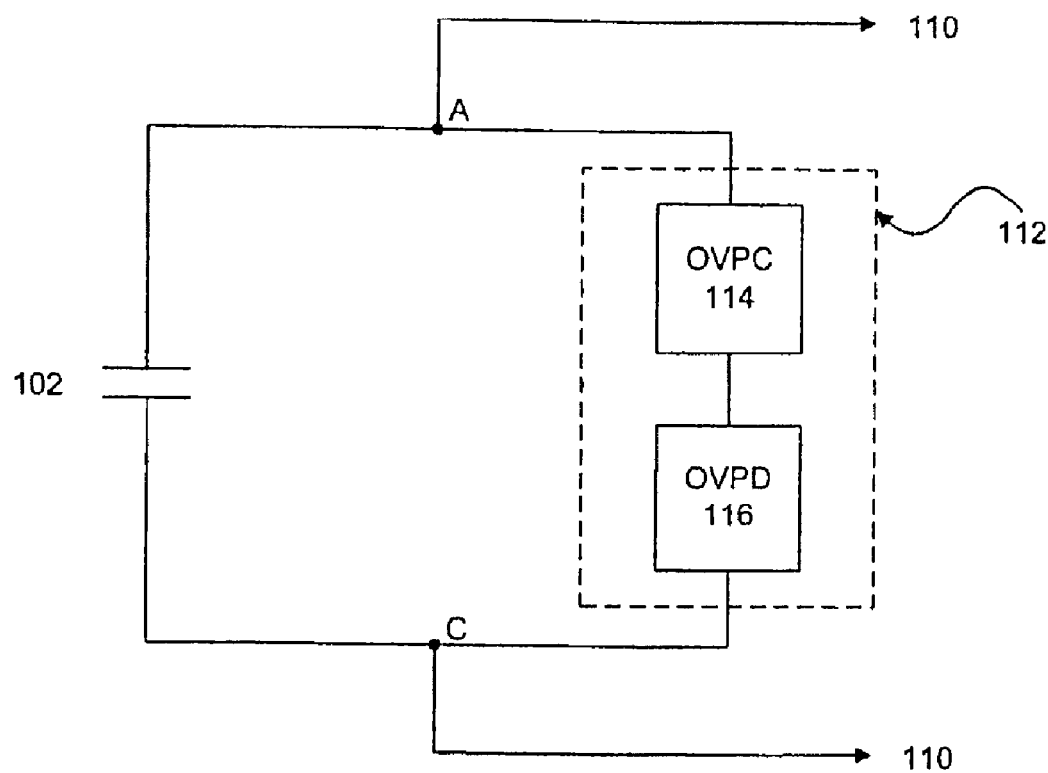
FIG. 2 illustrates a block diagram of an embodiment of the invention.

FIG. 2 illustrates an embodiment of the present invention in block diagram form. In particular, an over-voltage protection circuit 112 is illustrated, which is preferably connected in parallel to a charging circuit (not shown) via charging leads 110. The over-voltage protection circuit 112 is used during battery charging for maintaining a voltage across an energy storage device, such as a battery, below a predetermined voltage. The over-voltage protection circuit 112 comprises an over-voltage protection controller 114 and an over-voltage protection device 116.

The over-voltage protection controller 114 can comprise any device that is actuated in response to a voltage measured between nodes A and C that meets or exceeds a predetermined voltage, and connects the over-voltage protection device 116 in parallel with the energy storage device 102 when actuated. Consequently, current is conducted to the over-voltage protection device 116 and charge drawn from the energy storage device 102 only when over-voltage occurs. The over-voltage protection controller 114 can comprise a switch, which is actuated in response to a voltage measured between nodes A and C that meets or exceeds the predetermined voltage. When the switch is actuated in response to an over-voltage condition, current is conducted to the over-voltage protection device 116 and charge is drawn from the energy storage device 102. The switch can be, for example, a field effect transistor (FET), relay switch, bipolar junction transistor (BJT) or multiplexer (MUX). The switch preferably intrinsically comprises an over-voltage detector that causes the switch to be actuated when a voltage measured between nodes A and C exceeds a predetermined voltage. Alternatively, a separate over-voltage detector can be used in conjunction with the switch.

The over-voltage protection device 116 draws charge from the energy storage device 102 experiencing over-voltage. The over-voltage protection device 116 can comprise any device that is able to accept the drawn excess charge and dispose of it. The over-voltage protection device 116 can dissipate the energy itself, for example if a resistor is used. Alternatively, the over-voltage protection device 116 may temporarily store the excess charge, for example if a capacitor or inductor is used, then transfer it elsewhere to be dissipated. In the latter case, the over-voltage protection device 116 may temporarily store such charge until it is connected to a dissipation controller (not shown), at which time the charge stored therein may be dissipated in an appropriate manner, as will be well known to one skilled in the art.

For example, the dissipation controller can comprise a circuit having a dissipation switch that connects said over-voltage protection device to ground in order to dissipate the stored voltage. Preferably, this dissipation controller will also comprise a dissipation control mechanism that actuates the dissipation switch so as to connect and disconnect the over-voltage protection device 116 from the dissipation controller according to appropriate conditions.

Of course, the energy storage device 102 may, in fact, comprise a plurality of energy storage components connected in series. In such a case, a separate over-voltage protection circuit 112 can be connected in parallel to the terminals of each energy storage component in order to achieve a similar result as described in the embodiments above.

Figure 3:
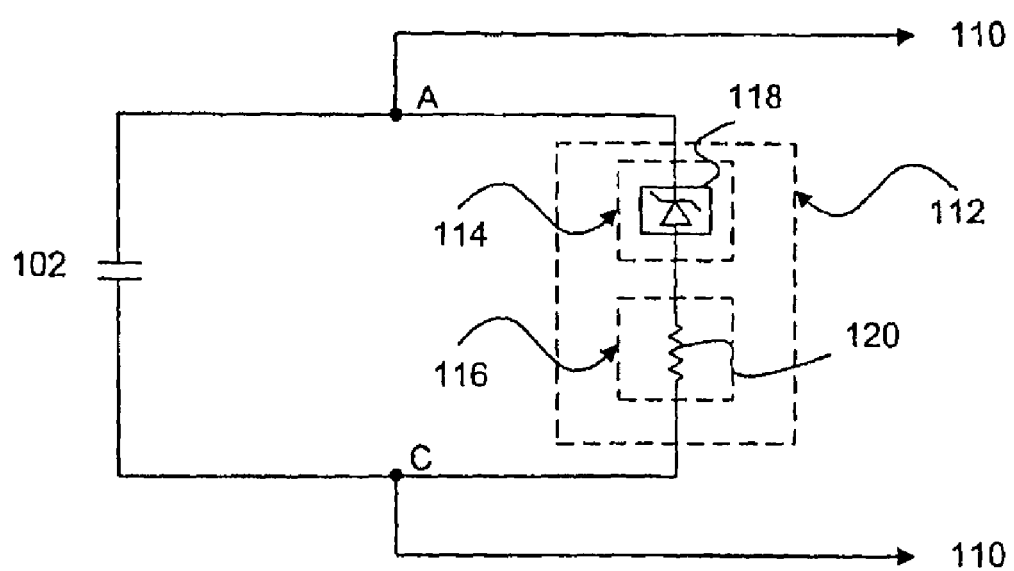
FIG. 3 illustrates an embodiment of the invention.

FIG. 3 illustrates a presently preferred embodiment of the present invention, showing an over-voltage protection circuit 112. In the embodiment shown in FIG. 3, a shunt regulator 118 is used as the over-voltage protection controller 114. The use of a shunt regulator is advantageous in that shunt regulators have very sharp 'turn-on' characteristics. Suppose, for example, that a shunt regulator is chosen whose rated threshold voltage is below, but preferably near, the maximum specified voltage of the energy storage device 102. When the voltage measured across the energy storage device 102 is below the threshold voltage of shunt regulator 118, negligible current will flow through the shunt regulator 118. If the voltage of the energy storage device 102 rises during charging to the threshold voltage of the shunt regulator 118, the shunt regulator causes current to flow through it and through resistor 120. Any excess energy is dissipated primarily across the resistor 120, which is employed in this example as the over-voltage protection device 116. Current continues to flow through the shunt regulator 118 until the voltage of the energy storage device 102 falls below the threshold voltage of the shunt regulator. The shunt regulator 118, therefore, acts as both a switch and an over-voltage detector in this embodiment. If the leakage resistance in the shunt regulator 118 is suitable, the shunt regulator 118 can also perform the function of the over-voltage protection device 116, thereby obviating the need for resistor 120.

Although FIG. 3 illustrates an exemplary embodiment of the invention, many alternative embodiments are possible. The energy storage device 102 may comprise a plurality of energy storage components connected in series and a separate over-voltage protection circuit 112 can be connected in parallel to the terminals of each energy storage component in order to achieve a similar result as described in the embodiments above.

Figure 4:
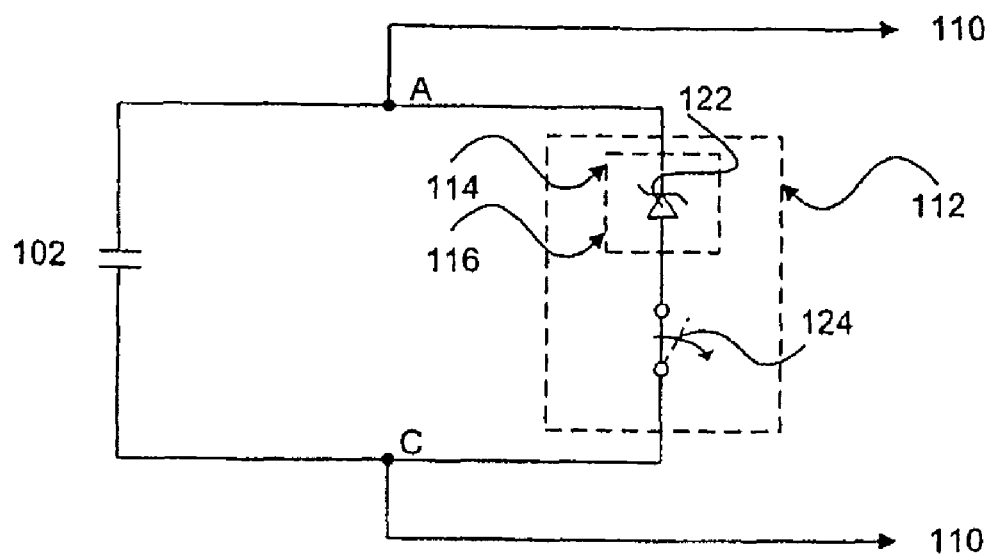
FIG. 4 illustrates an embodiment of the invention.

FIG. 4 illustrates an example of such an alternative embodiment. In FIG. 4, a zener diode 122 can be used instead of the shunt regulator 118 as the over-voltage protection controller 114. The zener diode 122 is advantageously chosen such that its threshold voltage is equal to or slightly less than the predetermined voltage at or over which over-voltage will occur. In this embodiment, it is preferable to have a switch 124 disposed between the zener diode 122 and node C. The switch 124 is closed during charging and open otherwise, so that power is dissipated in the zener diode 122 only while charging the energy storage device 102. As one skilled in the art can appreciate, little current flows through the zener diode 122 as long as the voltage of the energy storage device 102 remains below the threshold voltage of the zener diode. If the voltage rises above the threshold voltage of the zener diode 122, exponentially greater current flows through the zener diode. Either the zener diode itself, or a combination of the zener diode 122 and a series resistor or resistors (not shown in FIG. 4), dissipates this excess energy. In the case of using the zener diode 122 by itself, it is both over-voltage protection controller 114 and over-voltage protection device 116. Where the zener diode 122 is used in conjunction with a resistor, or a plurality of resistors, (not shown in FIG. 4) the over-voltage protection device 116 functionally comprises both the zener diode 122 and the resistor.

Figure 5:
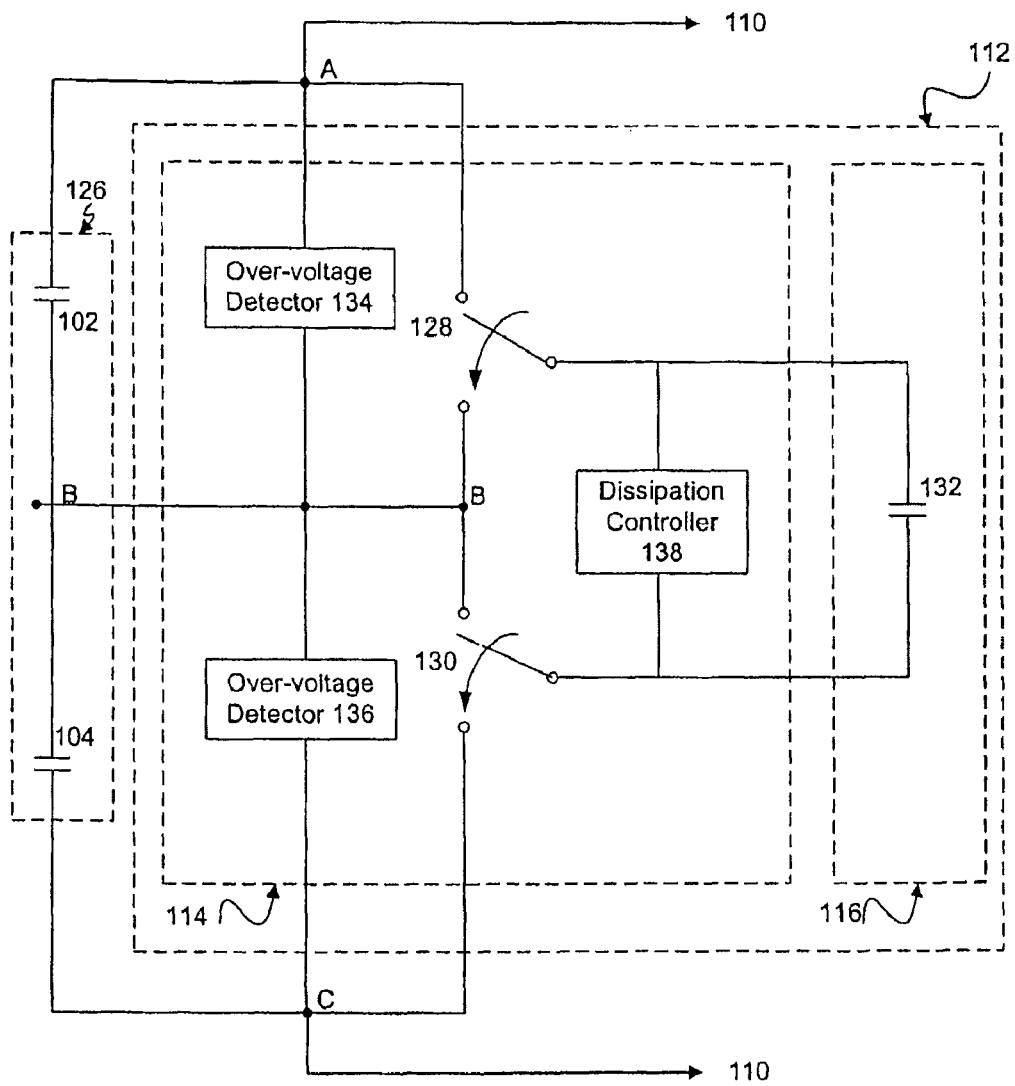
FIG. 5 illustrates an alternative embodiment of the invention.
Figure 6:
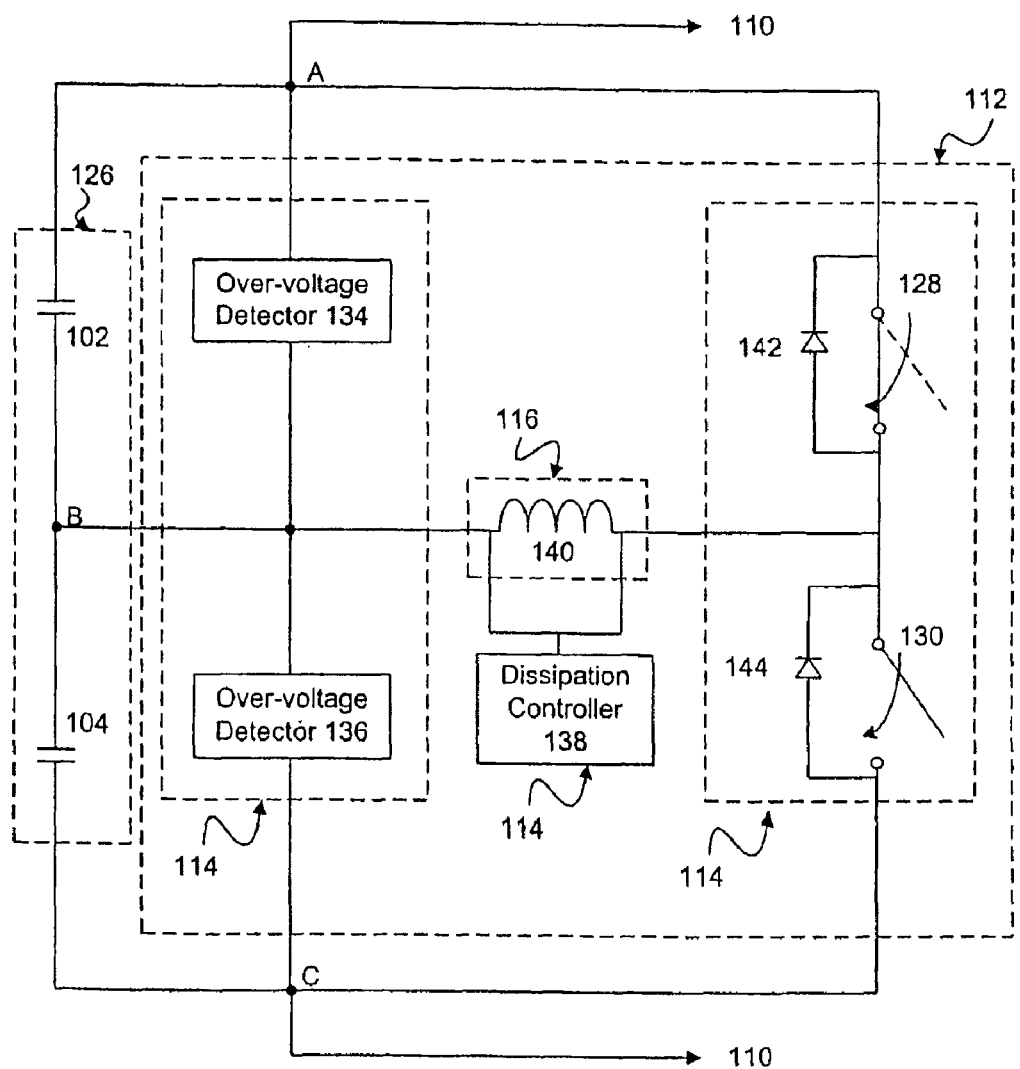
FIG. 6 illustrates a further alternative embodiment of the invention.

There are, however, further alternative embodiments that may be considered in the case where the energy storage device comprises a plurality of energy storage components. Such embodiments cannot be implemented with the energy storage device comprising only one energy storage component. FIGS. 5 and 6 illustrate such exemplary alternative embodiments. Although these figures illustrate an energy storage device comprising two energy storage components, the designs may be employed in circuits having more than two energy storage components, with appropriate modifications being apparent to one of ordinary skill in the art. For example, if energy storage components are provided in multiples of two, circuits such as those illustrated in FIGS. 5 and 6 may be connected in parallel with each pair of energy storage components. Alternatively, the over-voltage protection device may be suitably connected to more than two energy storage components, as long as the properties of the over-voltage protection device are selected such that it can handle possible over-voltage from each of the energy storage components to which it is connected.

FIG. 5 illustrates an alternative embodiment of the invention. In this figure, energy storage device 126 comprises the energy storage components 102, 104, which are connected to the over-voltage protection circuit 112. In FIG. 5, the over-voltage protection controller 114 comprises switches 128, 130, and the over-voltage protection device 116 comprises capacitor 132. These switches 128, 130 could be, for example, FETs, relay switches, BJTs, MUXs, or any other suitable means as described earlier. The switches 128, 130 are connected to a capacitor 132 in order to protect against over-voltage by balancing the charge between the energy storage components. When the energy storage components 102, 104 are charged and one energy storage component is at or above the predetermined voltage, the switches 128, 130 are actuated and connect or disconnect the capacitor 132 to each energy storage component 102, 104 in order to balance the charge between them.

In this embodiment, the switches 128, 130 are actuated in phase with one another as long as over-voltage occurs. Over-voltage detectors 134 and 136 preferably control such actuation for switches 128, 130 respectively. In this case, the over-voltage detector performs the functions of both detecting when over-voltage occurs, and controlling the actuation of the switch. A single integral over-voltage detector can alternatively perform the functions of the two over-voltage detectors 134 and 136.

Figure 1:
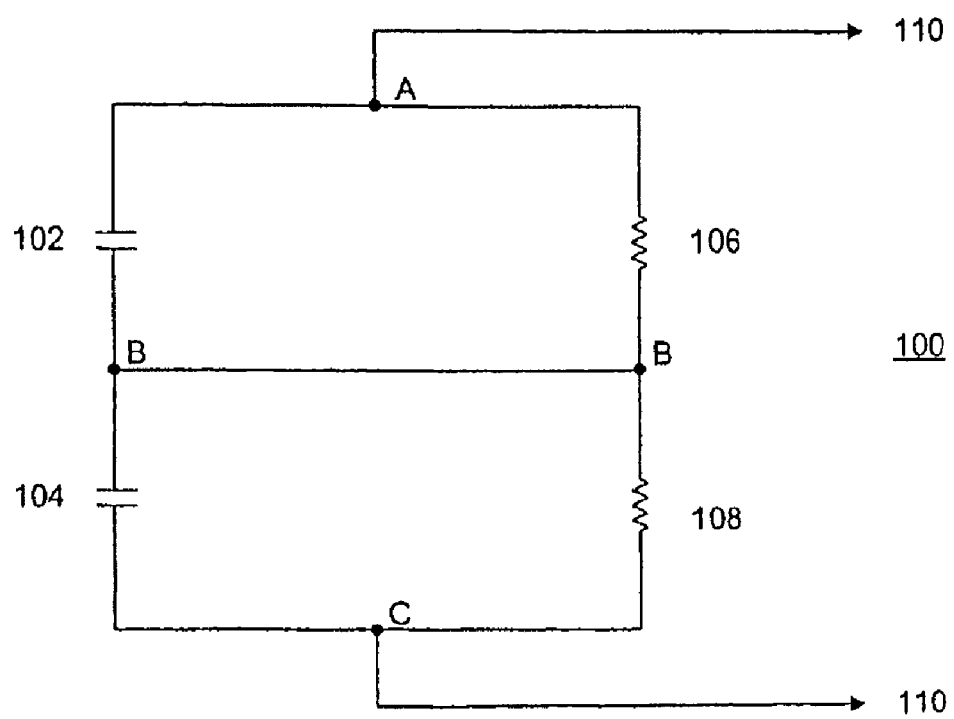
FIG. 1 illustrates a typical over-voltage protection circuit.

An advantage of this embodiment is that any excessive charge is transferred from the energy storage component with greater charge to the energy storage component with lesser charge and such excessive charge is not dissipated as it is across the resistors in FIG. 1. For example, if energy storage component 102 were at or over the predetermined voltage, switches 128 and 130 would connect capacitor 132 in parallel to energy storage component 102, so that the charge is then transferred to the capacitor 132. Later, switches 128 and 130 would connect capacitor 132 to energy storage component 104 and charge would transfer to energy storage component 104 since its voltage is lower that that of energy storage component 102. Once again, the actuation of the switches is preferably controlled as described above.

Alternatively, instead of using the over-voltage detectors 134 and 136, the circuit can comprise an actuating means (not shown in FIG. 5) that actuates the connection and disconnection of the capacitor 132 to each energy storage component 102, 104 at a regular time interval. This provides for automatic charge balancing without the need for the over-voltage detectors 134, 136.

In a case such as in FIG. 5 where the over-voltage protection device 116 temporarily stores charge associated with drawn excess charge, a dissipation controller 138 is preferably provided as part of the over-voltage protection circuit 114. This dissipation controller 138 enables the charge stored in the over-voltage protection device 116 to be dissipated in an appropriate manner, as will be well known to one skilled in the art. For example, the dissipation controller can comprise a circuit having a dissipation switch that connects said over-voltage protection device to ground in order to dissipate the stored voltage. Preferably, this dissipation controller will also comprise a dissipation control mechanism that actuates the dissipation switch so as to connect and disconnect the over-voltage protection device 116 from the dissipation controller according to appropriate conditions. In an alternative embodiment, a single integral controller may perform all the functions of over-voltage detectors 134, 136 as well as those of the dissipation controller 138.

FIG. 6 is another alternative embodiment of the invention. This figure illustrates a circuit that operates similarly to the circuit in FIG. 5, but has an improved efficiency over the embodiment in FIG. 5. In FIG. 6, energy storage device 126 comprises the energy storage components 102, 104, which are connected to the over-voltage protection circuit 112. Each energy storage component 102, 104 is connected to switch 128, 130. The switches 128, 130 alternatively connect the respective energy storage component to an inductor 140, thus moving any excess charge between the energy storage components. In this embodiment, the switches 128, 130 are actuated out of phase with one another and cannot both be closed at the same time.

Diodes 142 and 144 conduct during the brief interval when one switch has opened and the other has not yet closed while there is energy stored in inductor 140. When an energy storage component charges to (or just over) the predetermined voltage, the factor affecting which switch will close first is which energy storage component has the greater voltage.

For example, consider the situation where, within the circuit in FIG. 6, energy storage component 104 is at or just above the predetermined voltage and has a greater voltage than energy storage component 102. Then, switch 130 closes for a period of time to energize, but not saturate, inductor 140. Later, switch 130 opens and diode 142 immediately begins to conduct, because there is energy stored in inductor 140. Switch 128 subsequently closes, short-circuiting diode 142 to improve efficiency, since switch 128 has a lower voltage across it than diode 142 when it is closed, and thereby transferring charge to energy storage component 102.

In FIG. 6, since the over-voltage protection device 116 temporarily stores charge associated with drawn excess charge, a dissipation controller 138 is preferably provided as part of the over-voltage protection circuit 114. This dissipation controller 138 enables the charge stored in the over-voltage protection device 116 to be dissipated in an appropriate manner, as will be well known to one skilled in the art. For example, the dissipation controller can comprise a circuit having a dissipation switch that connects said over-voltage protection device to ground in order to dissipate the stored voltage. Preferably, this dissipation controller will also comprise a dissipation control mechanism that actuates the dissipation switch so as to connect and disconnect the over-voltage protection device 116 from the dissipation controller according to appropriate conditions. In an alternative embodiment, a single integral controller may perform all the functions of over-voltage detectors 134, 136 as well as those of the dissipation controller 138.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. An over-voltage protection circuit for connection to a charging circuit for maintaining a voltage across a plurality of electrical energy storage devices at or below a predetermined voltage during charging, comprising:
    a first electrical energy storage device connected from a top voltage rail to a primary junction;
    a second electrical energy storage device connected from the primary junction to a bottom voltage rail; and
    an inductor;
    the over-voltage protection circuit to perform a first procedure in which a charge is drawn from the first electrical energy storage device through the inductor to energize the inductor, for the inductor to then cause a current that charges the second storage device;
    the over-voltage protection circuit to perform a second procedure in which a charge is drawn from the second electrical energy storage device through the inductor to energize the inductor, for the inductor to then cause a current that charges the first storage device; and a dissipation controller to perform a third procedure in which a charge is discharged from the energized inductor upon detection of an over-voltage condition.

2. The over-voltage protection circuit of claim 1, further comprising:

a first diode and a first switch connected from the top rail to a secondary junction;

a second diode and a second switch connected from the secondary junction to the bottom rail, with the inductor connected from the primary junction to the secondary junction;

the over-voltage protection circuit being configured in the first procedure to:

close the first switch to conduct current from the top rail, through the first switch and the inductor, to the primary junction to energize the inductor; and open the first switch, causing the inductor to induce a temporary current to flow from the bottom rail through the second diode and the inductor, to the primary junction; and the over-voltage protection circuit being configured in the second procedure to:

close the second switch to conduct current from the primary junction, through the second switch and the inductor, to the bottom rail to energize the inductor; and open the second switch, causing the inductor to induce a temporary current to flow from the primary junction through the first diode and the inductor, to the top rail.

3. The circuit of claim 1, wherein the first electrical energy storage device is a capacitor.

4. The circuit of claim 1, wherein the first electrical energy storage device is a battery.

5. An over-voltage protection circuit for connection to a charging circuit for maintaining a voltage across a plurality of electrical energy storage devices at or below a predetermined voltage during charging, comprising:

a first electrical energy storage device connected from a top voltage rail to a primary junction;

a second electrical energy storage device connected from the primary junction to a bottom voltage rail;

an inductor;

a dissipation controller to perform a dissipation procedure in which a charge is discharged from the energized inductor upon detection of an over-voltage condition;

the over-voltage protection circuit to perform a first procedure in which a charge is drawn from the first electrical energy storage device through the inductor to energize the inductor, for the inductor to then cause a current that charges the second electrical energy storage device; and the over-voltage protection circuit to perform a second procedure in which a charge is drawn from the second electrical energy storage device through the inductor to energize the inductor, for the inductor to then cause a current that charges the first electrical energy storage device.

6. The over-voltage protection circuit of claim 5, further comprising:

a first diode, the first diode and the first switch connected from the top rail to a secondary junction;

a second diode, the second diode and the second switch connected from the secondary junction to the bottom rail, with the inductor connected from the primary junction to the secondary junction;

the over-voltage protection circuit being configured in the first procedure to:

close the first switch to conduct current from the top rail, through the first switch and the inductor, to the primary junction to energize the inductor; and open the first switch, causing the inductor to induce a temporary current to flow from the bottom rail through the second diode and the inductor, to the primary junction; and the over-voltage protection circuit being configured in the second procedure to:

close the second switch to conduct current from the primary junction, through the second switch and the inductor, to the bottom rail to energize the inductor; and open the second switch, causing the inductor to induce a temporary current to flow from the primary junction through the first diode and the inductor, to the top rail.

7. The over-voltage protection circuit of claim 5, further comprising a voltage sensor that detects the over-voltage condition and that closes the first switch in response to the first storage device being excessively charged, and closes the second switch in response to the second storage device being excessively charged.

8. The over-voltage protection circuit of claim 5, configured to alternate between the first procedure and the second procedure at a regular time interval.

9. A method of operating an over-voltage protection circuit electrical circuit for charging a plurality of electrical energy storage devices that includes a first electrical energy storage device connected from a top voltage rail to a primary junction, a second electrical energy storage device connected from the primary junction to a bottom voltage rail, an inductor, a first diode connected from the top rail to a secondary junction, and a second diode connected from the secondary junction to the bottom rail, with the inductor connected from the primary junction to the secondary junction, the method comprising:

performing a first procedure in which a charge is drawn from the first electrical energy storage device through the inductor to energize the inductor, for the inductor to then cause a current that charges the second electrical energy storage device; and performing a second procedure in which a charge is drawn from the second electrical energy storage device through the inductor, for the inductor to then cause a current that charges the first electrical energy storage device; and discharging the energized inductor upon detection of an over-voltage condition.

10. The method of claim 9, wherein the first electrical energy storage device is a capacitor.

11. The method of claim 9, wherein the first electrical energy storage device is a battery.

12. The method of claim 9, wherein the first procedure and the second procedure are performed alternatingly at a regular time interval.

* * * * *